W. G. McCREIGHT.
WAGON-TIRE TIGHTENERS.
No. 194,161.  Patented Aug. 14, 1877.
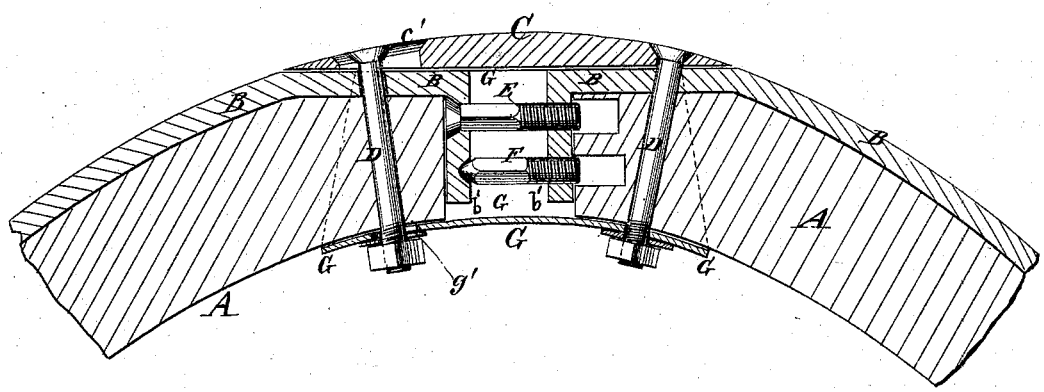

UNITED STATES PATENT OFFICE.

WILLIAM G. McCREIGHT, OF ATLANTA, MISSISSIPPI.

IMPROVEMENT IN WAGON-TIRE TIGHTENERS.

Specification forming part of Letters Patent No. 194,161, dated August 14, 1877; application filed June 4, 1877.

*To all whom it may concern:*

Be it known that I, WILLIAM G. MCCREIGHT, of Atlanta, county of Chickasaw, and State of Mississippi, have invented a new and useful Improvement in Wagon-Tire Tighteners, of which the following is a specification:

The figure is a sectional view of a portion of the rim of a wheel to which my improvement has been applied.

Similar letters of reference indicate corresponding parts.

The object of this invention is to furnish an improved attachment for the rim of wagon-wheels, to enable the tire to be easily and quickly tightened without being removed from the wheels, and which shall be simple in construction, convenient in use, and effective in operation.

In the drawing, A represents the adjacent ends of two fellies, which do not quite meet. B is the tire, which is open, and has its ends $b'$ bent inward at right angles to overlap the ends of the fellies A. E is a screw, the head of which is countersunk into the inner side of one of the flanges $b'$, near its angle, and which screws into a screw-hole in the other flange $b'$, near its angle. F is a screw, which screws into one of the flanges $b'$, near its end, and the other end of which rests against the other flange $b'$, near its end, or in a recess formed in said flange.

By this construction, by screwing in the screw F, and then screwing in the screw E, the said screw E will draw the ends of the tire B toward each other and tighten it upon the fellies A. The screw F is then turned out until its end bears against the other flange $b'$, to brace the said flanges and stiffen the joint. The outer corners of the fellies A are beveled off, and the tire B is bent inward to fit upon the said bevels, to form a seat for the cap C, which is made of tire-iron, and so formed that its outer surface may form a part of the circle of the outer surface of the tire B, as shown in the drawing. The cap C is secured in place by two bolts, D, which pass through it, through the tire B, and the fellies A, and have nuts screwed upon their inner ends. The joint in the wheel-rim is covered, protected, and strengthened by the iron cap G, which is secured in place by the bolts D. The caps C and G have short slots $c'$ $g'$ formed in them to receive one of the bolts D, to allow the ends of the tire and fellies to be drawn closer together.

Having thus fully described my invention, I claim as new and desire to secure by Letters Patent—

The combination of the draw-screw E and the brace-screw F with flanges $b'$, formed upon the ends of an open tire, B, and with the adjacent ends of two fellies, A, substantially as herein shown and described.

WILLIAM GREEN McCREIGHT.

Witnesses:
E. S. ELLZEY,
J. W. ABERNETHY.